US012590409B2

(12) United States Patent
Anderson et al.

(10) Patent No.: US 12,590,409 B2
(45) Date of Patent: Mar. 31, 2026

(54) ACRYLATE OLIGOMERS, ACRYLATE OLIGOMER EMULSIONS, AND FLUORINE-FREE STAIN-RELEASE COMPOSITIONS CONTAINING THE SAME

(71) Applicant: 3M INNOVATIVE PROPERTIES COMPANY, St. Paul, MN (US)

(72) Inventors: Jeffrey T. Anderson, Lake Elmo, MN (US); Michael T. Hayes, St. Anthony, MN (US); Angela J. Nixon, Rosemount, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 319 days.

(21) Appl. No.: 18/272,685

(22) PCT Filed: Feb. 3, 2022

(86) PCT No.: PCT/IB2022/050952

§ 371 (c)(1),
(2) Date: Jul. 17, 2023

(87) PCT Pub. No.: WO2022/167974

PCT Pub. Date: Aug. 11, 2022

(65) Prior Publication Data

US 2025/0283273 A1 Sep. 11, 2025

Related U.S. Application Data

(60) Provisional application No. 63/145,167, filed on Feb. 3, 2021.

(51) Int. Cl.

| | |
|---|---|
| ***D06M 15/263*** | (2006.01) |
| ***C08F 12/08*** | (2006.01) |
| ***C08F 20/18*** | (2006.01) |
| ***C08G 18/28*** | (2006.01) |
| ***D06M 15/233*** | (2006.01) |
| ***D06M 15/564*** | (2006.01) |
| *D06M 101/06* | (2006.01) |
| *D06M 101/32* | (2006.01) |
| *D06M 101/34* | (2006.01) |

(52) U.S. Cl.

CPC ........... *D06M 15/263* (2013.01); *C08F 12/08* (2013.01); *C08F 20/18* (2013.01); *C08G 18/288* (2013.01); *D06M 15/233* (2013.01); *D06M 15/564* (2013.01); *D06M 2101/06* (2013.01); *D06M 2101/32* (2013.01); *D06M 2101/34* (2013.01); *D06M 2200/01* (2013.01); *D06M 2200/12* (2013.01)

(58) Field of Classification Search

USPC .................................................. 560/152, 202
See application file for complete search history.

(56) References Cited

U.S. PATENT DOCUMENTS

| | | | | |
|---|---|---|---|---|
| 3,689,593 | A * | 9/1972 | Jackson | C08G 18/672 524/366 |
| 10,138,392 | B2 | 11/2018 | Sworen et al. | |
| 2006/0094851 | A1 | 5/2006 | Audenaert et al. | |
| 2007/0128260 | A1 | 6/2007 | Lau et al. | |
| 2008/0278672 | A1 * | 11/2008 | Yano | C09J 133/08 349/193 |
| 2014/0295724 | A1 | 10/2014 | Sworen et al. | |
| 2016/0090508 | A1 | 3/2016 | Sworen et al. | |
| 2018/0016738 | A1 | 1/2018 | Coppens et al. | |
| 2018/0023245 | A1 | 1/2018 | Dams et al. | |

FOREIGN PATENT DOCUMENTS

| | | | |
|---|---|---|---|
| WO | 2013059387 | A1 | 4/2013 |
| WO | 2017066073 | A1 | 4/2017 |
| WO | 2018085238 | A1 | 5/2018 |
| WO | 2021024116 | A1 | 2/2021 |

OTHER PUBLICATIONS

International Search Report for PCT International Application No. PCT/IB2022/050952, mailed on Apr. 29, 2022, 5 pages.

* cited by examiner

*Primary Examiner* — Fred M Teskin

(57) ABSTRACT

The present invention is an acrylate oligomer represented by the formula (I) where $R^1$ is hydrogen or methyl; $R^2$ is an alkyl group having from 2 to 18 carbons, inclusive; $R^3$ is hydrogen or hydroxyl; Y is hydrogen or an initiator residue; Z is a single bond or methylene; and n is an integer from 9 to 40, inclusive. The present invention also includes acrylate oligomer emulsions including the disclosed oligomer and fluorine-free treating compositions including the acrylate oligomer emulsion. Methods of making and using such compositions are also disclosed.

(I)

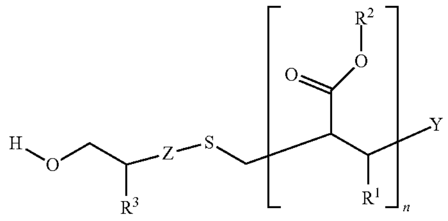

15 Claims, No Drawings

ACRYLATE OLIGOMERS, ACRYLATE OLIGOMER EMULSIONS, AND FLUORINE-FREE STAIN-RELEASE COMPOSITIONS CONTAINING THE SAME

CROSS REFERENCE TO RELATED APPLICATIONS

This application is a national stage filing under 35 U.S.C. 371 of PCT/IB2022/050952, filed Feb. 3, 2022, which claims the benefit of U.S. Provisional Patent Application No. 63/145,167, filed Feb. 3, 2021, the disclosure of which is incorporated by reference in its/their entirety herein.

BACKGROUND

Fluorochemicals have been widely used for more than fifty years as textile finishing agents that provide durable stain release, oil and water repellency, and dynamic water repellency. However, due to environment and health concerns, governmental agencies, as well as nongovernmental organizations, have lately been pushing the apparel market towards the use of textile finishing agents that are produced with raw materials that do not include fluorochemicals. Consequently, fabric manufacturers have a need for non-fluorinated textile finishing compositions.

SUMMARY

In one aspect, provided is an oligomer represented by the formula

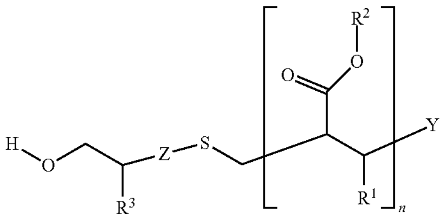

wherein
- $R^1$ is hydrogen or methyl,
- $R^2$ is an alkyl group having from 2 to 18 carbons, inclusive,
- $R^3$ is hydrogen or hydroxyl,
- Y is hydrogen or an initiator residue,
- Z is a single bond or methylene, and
- n is an integer from 9 to 40, inclusive.

In another aspect, provided is an acrylate oligomer emulsion comprising:

an oligomer represented by the formula

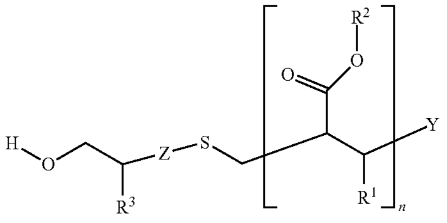

wherein
- $R^1$ is hydrogen or methyl,
- $R^2$ is an alkyl group having from 2 to 18 carbons, inclusive,
- $R^3$ is hydrogen or hydroxyl,
- Y is hydrogen or an initiator residue,
- Z is a single bond or methylene, and
- n is an integer from 9 to 40, inclusive;

water; and a surfactant.

In another aspect, provided is a fluorine-free treating composition comprising:

an acrylate oligomer emulsion of the present disclosure.

In another aspect, provided is a method of treating a fibrous substrate, the method comprising:

preparing a fluorine-free treating composition comprising an acrylate oligomer emulsion of the present disclosure, applying the fluorine-free treating composition to a fibrous substrate in an amount sufficient to make the fibrous substrate exhibit stain release that is better than the stain release of a similar fibrous substrate without the composition applied.

In another aspect, provided is a fibrous substrate treated according to the disclosed methods.

In another aspect, provided is a urethane oligomer represented by the formula

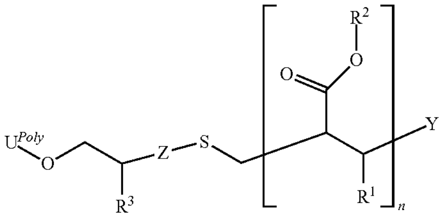

wherein
- $U^{Poly}$ comprises a urethane polymer backbone,
- $R^1$ is hydrogen or methyl,
- $R^2$ is an alkyl group having from 2 to 18 carbons, inclusive,
- $R^3$ is hydrogen or hydroxyl,
- Y is hydrogen or an initiator residue,
- Z is a single bond or methylene, and
- n is an integer from 9 to 40, inclusive.

In another aspect, provided is an oligomer represented by the formula

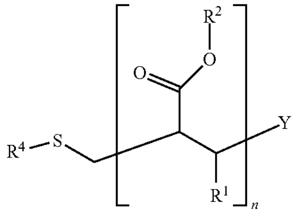

wherein
- $R^1$ is hydrogen or methyl,
- $R^2$ is an alkyl group having from 2 to 18 carbons, inclusive,
- $R^4$ is a hydrocarbon group,
- Y is hydrogen or an initiator residue, and
- n is an integer from 9 to 40, inclusive.

Herein, a "fluorine-free" treating composition means that a treating composition includes less than 1 weight percent (1 wt. %) fluorine in a treating composition based on solids, whether in a concentrate or ready-to-use treating composition. In certain embodiments, a "fluorine-free" treating composition means that a treating composition includes less than 0.5 wt. %, or less than 0.1 wt. %, or less than 0.01 wt. %. The fluorine may be in the form of organic or inorganic fluorine-containing compounds.

The term "oligomer" includes compounds with at least 9 repeating units and up to 40 repeating units. According to a particular embodiment, the oligomer has 9 to 20 repeating units.

The term "residue" means that part of the original organic molecule remaining after reaction.

The term "hydrocarbon" refers to any substantially fluorine-free organic group that contains hydrogen and carbon. Such hydrocarbon groups may be cyclic (including aromatic), linear, or branched. Suitable hydrocarbon groups include alkyl groups, alkylene groups, arylene groups, and the like. Unless otherwise indicated, hydrocarbon groups typically contain from 1 to 60 carbon atoms. In some embodiments, hydrocarbon groups contain 1 to 30 carbon atoms, 1 to 20 carbon atoms, 1 to 10 carbon atoms, 1 to 6 carbon atoms, 1 to 4 carbon atoms, or 1 to 3 carbon atoms.

The term "alkyl" refers to a monovalent group that is a residue of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 60 carbon atoms. In some embodiments, the alkyl groups contain 1 to 30 carbon atoms, 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, octadecyl, behenyl, adamantyl, norbornyl, and the like.

The term "alkylene" refers to a divalent group that is a residue of an alkane and includes groups that are linear, branched, cyclic, bicyclic, or a combination thereof. Unless otherwise indicated, the alkylene group typically has 1 to 60 carbon atoms. In some embodiments, the alkylene group has 1 to 30 carbon atoms, 1 to 20 carbon atoms, 1 to 10 carbon atoms, 2 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, 1,6 hexamethylene, and 1,10 decamethylene.

The term "arylene" refers to a divalent group that is aromatic and, optionally, carbocyclic. The arylene has at least one aromatic ring. Optionally, the aromatic ring can have one or more additional carbocyclic rings that are fused to the aromatic ring. Any additional rings can be unsaturated, partially saturated, or saturated. Unless otherwise specified, arylene groups often have 5 to 20 carbon atoms, 5 to 18 carbon atoms, 5 to 16 carbon atoms, 5 to 12 carbon atoms, 6 to 12 carbon atoms, or 6 to 10 carbon atoms.

The term (meth)acrylate refers to acrylates and methacrylates.

The term "comprises", and variations thereof, do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The term "room temperature" refers to a temperature of 20° C. to 25° C. or 22° C. to 25° C.

Herein, when a group is present more than once in a formula described herein, each group is "independently" selected, whether specifically stated or not. For example, when more than one Q group is present in a formula, each Q group is independently selected. Furthermore, subgroups contained within these groups are also independently selected.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

Features and advantages of the present disclosure will be further understood upon consideration of the detailed description as well as the appended claims.

DETAILED DESCRIPTION

Fabric manufacturers have a need for non-fluorinated textile finishing compositions that provide stain release and water repellency to the treated fibers and especially for non-fluorinated textile finishing compositions that can impart stain release and water repellency to textiles in the presence of other textile finishing agents, such as, for example, durable press finishes and fabric softeners. The present disclosure provides novel acrylate oligomers and fluorine-free stain-release compositions containing such acrylate oligomers that solve at least these problems.

Acrylate Oligomers

Provided herein are novel oligomers represented by Formula (I) below:

(I)

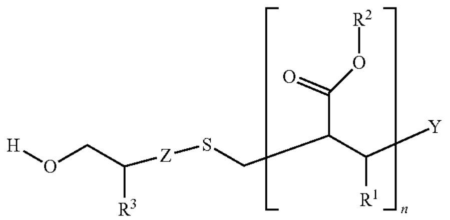

$R^1$ represents hydrogen or methyl. In a preferred embodiment $R^1$ is hydrogen.

$R^2$ represents an alkyl group having from 2 to 18 carbons. Examples include ethyl, propyl, n-butyl, t-butyl, pentyl, hexyl, cyclohexyl, heptyl, octyl, isooctyl, nonyl, decyl, undecyl, dodecyl tridecyl, tetradecyl, pentadecyl, hexadecyl, heptadecyl, and octadecyl groups. In some embodiments $R^2$ is an alkyl group having 2 to 4 carbons. In a preferred embodiment $R^2$ is a t-butyl group.

$R^3$ represents hydrogen or hydroxyl. In a preferred embodiment $R^3$ is hydrogen.

Y represents hydrogen or an initiator residue. The initiator residue may be the residue of a free-radical initiator, such as azo compounds, such as 2,2'-azobis(2-methylbutyronitrile), 2,2'-azobisisobutyronitrile ("AIBN"), and 2,2-azobis(2-cyanopentane) and the like, hydroperoxides such as cumene, t-butyl- and t-amyl-hydroperoxide, peroxyesters such as t-butylperbenzoate and di-t-butylperoxyphtalate, diacylperoxides such as benzoyl peroxide and lauroyl peroxide. For example, if the free radical initiator used in making the oligomers is 2,2-azodi(2-methylbutyronitrile) (i.e., VAZO-67 initiator), which has the following structure $CH_3CH_2—(CH_3)(CN)(C)—N{=}N(C)(CH_3)(CN)—CH_2CH_3$ the residue is believed to be $—(C)(CH_3)(CN)—CH—CH_3$, although there may be other fragments of the initiator forming the residue. In a preferred embodiment Y is a 2,2'-azodi(2-methylbutyronitrile) residue.

Z is a single bond or methylene. In a preferred embodiment, Z is a single bond.

n is an integer from 9 to 40. In a preferred embodiment, n is 18.

Techniques and conditions for making the oligomers described herein would be well known to one of skill in the relevant arts. The preparation of certain oligomers is presented in the Examples below. For example, a suitable mercapto alcohol reactant (e.g., 2-mercapto ethanol) and (meth acrylate monomer (e.g., t-butyl acrylate) can be combined with an appropriate solvent (e.g., ethyl acetate) and initiator (e.g., 2,2'-azodi(2-methylbutyronitrile) to form a mixture that is heated for a period of time to provide the disclosed oligomers.

In some embodiments, the oligomer may be prepared by the reaction of a mercapto alcohol (e.g., 2-mercaptoethanol, 3-mercapto-1-propanol, 3-mercapto-1,2-propanediol) with a (meth)acrylate monomer (e.g., octadecyl acrylate, ethyl methacrylate, t-butyl acrylate, t-butyl methacrylate) where the molar ratio of the mercapto alcohol to the (meth)acrylate is 1:9 to 1:40. In some preferred embodiments, the molar ratio of the mercapato alcohol to the (meth)acrylate is 1:16 to 1:20 (e.g., 1:18). In some embodiments, the oligomer is made by the radical-initiated reaction of a reaction mixture comprising 2-mercaptoethanol and a (meth)acrylate. In some embodiments the (meth)acrylate is selected from the group consisting of t-butyl acrylate, ethyl methacrylate, and combinations thereof. In a preferred embodiment, the mercapto alcohol is 2-mercapto ethanol, the (meth)acrylate is t-butyl acrylate, and the molar ratio of 2-mercapto ethanol to t-butyl acrylate is 1:18.

In order to prepare the disclosed oligomers, a free-radical initiator is used to initiate the oligomerization. Free-radical initiators include those known in the art and include, in particular, azo compounds such as 2,2'-azobis(2-methylbutyronitrile), 2,2'-azobisisobutyronitrile (AIBN) and 2,2'-azobis(2-cyanopentane), and the like, hydroperoxides such as cumene, t-butyl- and t-amyl-hydroperoxide, and the like, peroxyesters such as t-butylperbenzoate, di-t-butylperoxyphtalate, and the like, and diacylperoxides such as benzoyl peroxide, lauroyl peroxide, and the like.

Acrylate oligomers of the present disclosure may be prepared in reactions carried out in a wide variety of solvents suitable for organic free-radical reactions. The reactants can be present in the solvent at any suitable concentration, e.g., from about 5 percent to about 90 percent by weight, based on the total weight of the reaction mixture. Examples of suitable solvents include aliphatic and alicyclic hydrocarbons (e.g., hexane, beptane, cyclohexane), ethers (e.g., diethylether, glyme, diglyme, diisopropyl ether), esters (e.g., ethylacetate, butylacetate), ketones (e.g., acetone, methylethyl ketone, methyl isobutyl ketone), and mixtures thereof.

Acrylate oligomers of the present disclosure may be prepared in reactions carried out at a temperature suitable for conducting a free-radical oligomerization reaction. Particular temperatures and solvents for use can be readily selected by those of ordinary skill in the relevant arts based on considerations such as the solubility of reagents, the temperature required for the use of a particular initiator, molecular weight desired in the final oligomer, and the like. While it is not practical to enumerate particular temperatures suitable for all initiators and all solvents, generally suitable reaction temperatures are between 30° C. and 150° C. In certain embodiments, the reaction temperature is about 60° C. to about 70° C. Reaction times typically are within 1 to 24 hours.

Acrylate Oligomer Emulsions

Acrylate oligomer emulsions of the present disclosure are typically aqueous emulsions including oligomers represented by Formula (I) and a surfactant. Techniques and conditions for making the acrylate oligomer emulsions described herein would be well known to one of skill in the relevant arts.

The preparation of certain acrylate oligomer emulsions is presented in the Examples below. For example, an acrylate oligomer as described above and surfactant (e.g., ARQUAD 12-50) may be combined with water and an appropriate organic solvent (e.g., methyl isobutyl ketone) to form a mixture that is sonicated for a period of time (e.g., four minutes) with, for example, a BRANSON SONIFIER 450 (Branson Ultrasonics Corp., Danbury, CT). The resulting emulsion may be heated (e.g., to 100° C.) to remove, or "solvent strip" organic solvents and some water to provide an acrylate oligomer emulsion free of organic solvents. In some embodiments, the acrylate oligomer emulsion may include about 15 wt. % to 30 wt. %, 18 wt. % to 28 wt. %, or 24 wt. % to 26 wt. % of the oligomer on a solids basis.

Acrylate oligomer emulsions of the present disclosure can include conventional cationic, nonionic, anionic, and/or zwitterionic (i.e., amphoteric) surfactants (i.e., emulsifiers). A mixture of surfactants may be used, e.g., containing nonionic and ionic surfactants. Suitable nonionic surfactants can have high or low HLB values, such as TERGITOL's, TWEEN's, and the like. Suitable cationic surfactants include mono- or bi-tail ammonium salts such as, for example, ARQUAD 12-50 (Akzo Nobel, Chicago, IL). Suitable anionic surfactants include sulfonic and carboxylic aliphatic compounds and their salts, such as sodium dodecylbenzenesulphonate (available from Rhodia, France), and the like. Suitable amphoteric surfactants include cocobetaines, sulphobetaines, amine-oxides, and the like. In some embodiments, the acrylate oligomer emulsion may include about 0.3 wt. % to 1.3 wt. of a surfactant on a solids basis.

In some embodiments, acrylate oligomer emulsions of the present disclosure may optionally include a glycol (e.g., propylene glycol, ethylene glycol, glycol ether), a preservative (e.g., DANTOGARD PLUS), and combinations thereof.

Fluorine-Free Treating Composition

Techniques and conditions for making the fluorine-free treating compositions described herein would be well known to one of skill in the relevant arts.

The preparation of certain fluorine-free treating compositions is presented in the Examples below. For example, an acrylate oligomer emulsion, as described above, and water may be combined with stirring at room temperature. In some embodiments, fluorine-free treating compositions of the present disclosure may optionally include one or more of a fabric softener (e.g., MYKON HD), an antiwrinkle finish (e.g., PERMAFRESH URL/CATALYST 531), and a protective material (e.g., FC-226).

Fluorine-free treating compositions of the present disclosure are useful for treating a fibrous substrate to enhance the substrate's stain release and water repellency. The fluorine-free treating composition may be used to treat a fibrous substrate as described in "Preparation of Treated Fabric via 'Padding' Process" in the Examples section. As used herein, a treated substrate exhibits enhanced stain release if it demonstrates a stain release value, as determined by the Stain Release Test described in the Examples section, higher than that of an untreated substrate subjected to the same testing. As used herein, a treated substrate exhibits enhanced water repellency if it demonstrates a water repellency value ("WR"), as determined by the Water Repellency Test described in the Examples section, higher than that of an untreated substrate subjected to the same testing. As used herein, a treated substrate exhibits enhanced water repellency if it demonstrates a spray rating value, as determined by the Spray Rating Test described in the Examples section, higher than that of an untreated substrate subjected to the same testing. Examples of fibrous substrates include, for example, textiles (e.g., woven cotton fabric, woven polyester/cotton fabric), leather, carpet, paper, and nonwoven fabrics (e.g., knit cotton fabric, knit polyester/cotton fabric).

Typically, an amount of fluorine-free treating composition is used to obtain a desired initial stain release, water repellency, and/or spray rating level. In certain embodiments, the amount of treating composition is at least 0.1 weight percent (wt. %), or at least 0.5 wt. %, or at least 1 wt. % solids on fabric ("SOF"). In certain embodiments, the amount of treating composition is up to 4 wt. %, or up to 3 wt. %, or up to 2 wt-% SOF.

EXAMPLES

Unless otherwise noted, all parts, percentages, ratios, etc. in the Examples and the rest of the specification are by weight.

TABLE 1

| Materials | | |
|---|---|---|
| Abbreviation | Description | Source |
| ME | 2-Mercapto ethanol | BASF (Ludwigshafen, Germany) |
| TBA | t-Butyl acrylate | Millipore Sigma (St. Louis, MO) |
| VAZO 67 | AMBN, 2,2'-Azodi(2-methylbutyronitrile) | Millipore Sigma (St. Louis, MO) |
| ETAC | Ethyl acetate | Millipore Sigma (St. Louis, MO) |
| ARQUAD 12-50 | Dodecyltrimethylammonium chloride | Akzo Nobel (Chicago, IL) |
| ETHAQUAD | Coco alkylbis(hydroxyethyl)methyl, chlorides | Akzo Nobel (Chicago, IL) |
| TMN-6 | Branched C12 to C14 secondary alcohol ethoxylates | Dow Chemical, Midland, MI |
| Tergitol 15-S-30 | Secondary alcohol hydrophobe with varying numbers of ethylene-oxide units | Dow Chemical, Midland, MI |
| PG | Propylene glycol | Alfa Aesar (Tewksbury, MA) |
| DANTOGARD PLUS | A mixture of DMDM Hydantoin and Iodopropynyl Butylcarbamate | Lonza Group LTD (Basel, Switzerland) |
| EMA | Ethyl methacrylate | Millipore Sigma (St. Louis, MO) |
| Sty | Styrene | Millipore Sigma (St. Louis, MO) |
| AN | Acrylonitrile | Millipore Sigma (St. Louis, MO) |
| ODA | Octadecyl acrylate | Millipore Sigma (St. Louis, MO) |
| N3300 | DESMODUR N-3300: aliphatic polyisocyanate (HDI trimer) | Bayer Material Science LLC, Pittsburgh, PA |
| MR Light | Mondur MR-Light polymeric diphenylmethane diisocyanate | Bayer Material Science LLC, Pittsburgh, PA |

TABLE 1-continued

| Materials | | |
| --- | --- | --- |
| Abbreviation | Description | Source |
| PEG | Carbowax PEG 1450: polyethylene glycol | Dow Chemical, Midland, MI |
| PPG | Polypropylene glycol 1000 | Dow Chemical, Midland, MI |
| DBTDL | Dibutyl tin dilaurate- catalyst | Millipore Sigma (St. Louis, MO) |
| MIBK | Methyl isobutyl ketone | Millipore Sigma (St. Louis, MO) |
| Stain K | KAYDOL White mineral oil | Witco Chemical Co. (Bradford, PA) |
| XAN | PHOBOL XAN Extender, a blocked isocyanate extender | Huntsman Corp. (Woodlands, TX) |
| Stain E | MAZOLA Corn oil | ACH Food Companies, Inc. (Oakbrook Terrace, IL) |
| FC-226 | 3M Protective Material FC-226 | 3M Company (St. Paul, MN) |
| PM-3705 | 3M Protective Material | 3M Company (St. Paul, MN) |
| PM-2688 | 3M Protective Material | 3M Company (St. Paul, MN) |
| PM-3888 | 3M Protective Material | 3M Company (St. Paul, MN) |
| PERMAFRESH ULR | DMDHEU (1,3-dimethylol-4,5-dihydroxyethyleneurea). Antiwrinkle finish. | Omnova Solutions (Chester, SC) |
| CATALYST 531 | Modified magnesium salt. Catalyst system for antiwrinkle finish. | Omnova Solutions (Chester, SC). |
| MYKON HD | Polyethylene wax emulsion. Softener | Omnova Solutions (Chester, SC). |
| P/C 65/35 | Woven 65/35 polyester/cotton twill fabric | Avondale Mills/Graniteville Fabrics (Graniteville, SC). |
| Cotton/Spandex | Woven 98/2 cotton/spandex twill fabric | Sapphire Finishing Mills, Ltd. (Lahore, Pakistan) |
| Grape juice | WELCH'S Concord Grape juice | Welch Foods, Inc. (Concord, MA) |
| Gravy | HEINZ Home Style Gravy Classic Chicken | H. J. Heinz Co. (Pittsburgh, PA) |
| Catalina | KRAFT Classic Catalina Dressing | Kraft Heinz Foods Company (Chicago, IL) |
| Pasta sauce | BARILLA Tomato and Basil Sauce | Barilla America, Inc. (Northbrook, IL) |
| Red Enchilada | OLD EL PASO Hot Red Enchilada Sauce | General Mills (Minneapolis, MN) |
| Grass | Finely ground grass clippings and water (2.5 parts water:1 part grass clippings) | Prepared in-house |
| Mud | Mud mixed with water (5 parts moist dirt:1 part water) | Prepared in-house |
| Ranch | KEN'S Ranch Dressing | Ken's Foods, Inc. (Marlborough, MA) |
| Mayo | HELLMAN'S Real Mayonnaise | Unilever (Englewood Cliffs, NJ) |
| Mustard | FRENCH'S Classic Yellow Mustard | The French's Food Company LLC (Springfield, MO) |
| Peanut Butter | SKIPPY Creamy Peanut Butter | Hormel Foods Sales, LLC (Austin, MN) |
| NUTELLA | NUTELLA | Ferrero U.S.A, Inc. (Parsippany, NJ) |
| ExVOO | GUSTARE VITA Extra Virgin Olive Oil | Hy-Vee, Inc. (West Des Moines, IA) |
| Butter Substitute | I CAN'T BELIEVE IT'S NOT BUTTER | Unilever (Englewood Cliffs, NJ) |
| HAWAIIAN | HAWAIIAN TROPIC Island Sport (SPF 30) | Edgewell Personal Care Brands, LLC. (Shelton, CT) |
| COPPERTONE | COPPERTONE Sunscreen Lotion Ultra Guard (SPF 50) | Bayer HealthCare LLC (Whippany, NJ) |
| Tanning Oil | HAWAIIAN TROPIC Dark Tanning Oil | Tanning Research Labs, Inc. (Daytona Beach, FL) |
| Dirty Motor Oil | 5W-20 synthetic motor oil with 3500 mile run time, normal engine use | Marv and Son's auto and truck repair (Isanti, MN) |
| P/C 40/60 | Woven 40/60 polyester/cotton twill fabric | Avondale Mills/Graniteville Fabrics (Graniteville, SC) |
| Ink | Round Stic Xtra Life Ball Pens, Medium Point (1.0 mm), Black | Staples (Woodbury, MN) |
| Cotton 1 | 100% cotton, woven, brown | Avondale Mills/Graniteville Fabrics (Graniteville, SC) |
| Cotton 2 | 100% cotton, woven, tan | Avondale Mills/Graniteville Fabrics (Graniteville, SC) |
| Knit Cotton | 100% cotton, knit | Fruit of the Loom (Bowling Green, Kentucky) |
| White Cotton | 100% cotton, Country Classics, CC SLD WHITE, 44 IN 18338 RN 35055 | JoAnn Fabrics (Woodbury, MN) |
| Acne Cream | OXY 10 acne cleaner maximum strength | The Mentholatum Company (Orchard Park, NY) |

TABLE 1-continued

| Materials | | |
|---|---|---|
| Abbreviation | Description | Source |
| Thermal Pique Royal blue | 100% PET, thermal pique, royal blue | |
| Nylon white | Filament Nylon 6.6 semi dull tafeta, White, Item code 1410002, Style 306A | Testfabrics (West Pittston, PA) |
| Pet white | Poly Pongee without optical brighteners, White, Item code 1411004, Style 700-1558 | Testfabrics (West Pittston, PA) |
| Pet blue | Poly Pongee, 75D*75D/145T*90T, Blue or medium color, dyeing and washing | |
| Nylon tan | 100% Nylon, tan | |
| Cotton 5 | 100% Cotton, Twill weave, tan | |
| n-Octylmercaptan | n-Octylmercaptan | Millipore Sigma (St. Louis, MO) |

Methods

Preparation of Treated Fabric Via "Padding" Process

The treatments were applied onto the textile substrates (i.e., fabrics) by immersing a fabric in a prepared fluorine-free treating composition and agitating until the fabric was saturated. The fabric was then processed through a horizontal roll padder/roller (obtained under the trade designation "HP1700" from Poterala Manufacturing Co., Greenville, SC) to remove excess fluorine-free treating composition and to obtain a certain Percent (%) Wet Pick Up ("WPU") (i.e., 100% WPU means that at the end of this process, the fabric had absorbed 100% of its own original weight of the emulsion, before drying). WPU for the following examples was typically 60% WPU to 70% WPU. Fabrics were placed in an oven, for drying and curing, at 302° F. (150° C.) for five minutes.

Treated Fabric Laundering for Examples 3 and 4

The laundering procedure consisted of placing treated fabric samples among cotton ballast, for a total weight of 1.8 kg (4 lb.). Fabrics were washed for ten cycles in a washing machine (obtained under the trade designation "KENMORE ELITE", model number 110.267962502 type 111, from Sears, Hoffman Estates, IL) using a 12 minute cycle at water temperature of 40° C. (105° F.), followed by a cold rinse and extraction. A commercial detergent (obtained under the trade designation "TIDE ORIGINAL" from Proctor & Gamble Co., Cincinnati, OH) was automatically dosed for each washing cycle, at a dosage of 37.6 grams. Fabrics were not dried between wash cycles. After the final wash cycle, the entire load was transferred to a dryer (obtained under the trade designation KENMORE 70 SERIES, model number 110.2962502 from Sears, Hoffman Estates, IL), and run on "High" setting for 45 minutes. After completion of the cycle, fabrics were removed, and left overnight at room temperature.

Water Repellency Test

A series of water-isopropyl alcohol test liquids ranging in concentration from 100 vol. % water to 80 vol. % isopropyl alcohol were used to determine a water repellency ("WR") rating of a treated substrate. A WR rating is related to the isopropyl alcohol content of the highest-content test liquid which did not penetrate or wet the substrate surface after 10 seconds exposure. Thus, substrates which were resistant only to 100 vol. % water (i.e., 0 vol. % isopropyl alcohol), the least penetrating of the test liquids, were given a rating of 0. Substrates which were resistant to 98 vol. % water (i.e., 2 vol. % isopropyl alcohol) were given a rating of 1. Substrates which were resistant to 95 vol. % water (i.e., 5 vol. % isopropyl alcohol) were given a rating of 2. Substrates which were resistant to 90 vol. % water (i.e., 10 vol. % isopropyl alcohol) were given a rating of 3. Substrates which were resistant to 80 (70, 60, 50, 40, 30, and 20) vol. % water (i.e., 20, 30, 40, 50, 60, 70, and 80 vol. % isopropyl alcohol, respectively) were given ratings of 4, 5, 6, 7, 8, 9, and 10, respectively. A test method from the American Association of Textile Chemists and Colorists, AATCC Test Method 193, was generally followed. However, in addition to the ratings of 0 to 10 outlined in the test method, substrates that were not resistant even to 100% water were given a rating of negative 1 (i.e., −1). The aqueous repellency kit, consisting of water/isopropanol blends of progressively lower surface tensions, is described in AATCC Test Method 193.

Stain Release Test

This test was used to evaluate the release of forced-in, oil-based stains from a treated fabric surface during simulated home laundering. The test is based on AATCC Test Method 130. The only difference is that other stains, in addition to those listed in Test Method 130, were tested, in the same way. Testing on some of the Examples employed both KAYDOL mineral oil (Stain K) and MAZOLA corn oil (Stain E); testing on other Examples employed other common stains. Five drops of a first staining agent were dropped onto the treated fabric surface in a single puddle, and five drops of a second staining agent were dropped to create a second, separate puddle on the treated fabric. The puddles were covered with glassine paper and were each weighted with a 5 lb. (2.3 kg) weight for 60 seconds. The weights and glassine paper were then removed from the fabric. The fabric samples were air-dried at ambient temperature and humidity for 30 minutes, and then washed and dried according to specifications given in AATCC Test Method 130. Samples were evaluated against a standard stain rating board and assigned a rating, based on the severity of any residual stain. There are two standard boards specified by AATCC Test Method 130—a board from AATCC (AATCC Stain Release Replica), with a rating of 1-5 (1 being worst; 5 being best), and a board by 3M (3M Stain Release Rating Scale), numbered from 1 to 8. An 8 represented total removal of the stain, whereas a 1 represented a very dark stain.

Spray Rating ("SR") Test

The spray rating ("SR") of a treated fabric is a value indicative of the dynamic repellency of the treated fabric to water that impinges on the treated fabric. The SR was measured by AATCC Test Method 22-2017, published in the 2018 Technical Manual of the American Association of Textile Chemists and Colorists ("AATCC"). The SR was obtained by spraying 250 mL water on the treated fabric from a height of 15 cm. The wetting pattern was visually rated using a 0 to 100 scale from the test method, where 0 means complete wetting and 100 means no wetting at all. SR was measured initially and after the fabric was laundered ten times (designated as 10 L), as described above.

Example 1. Preparation of Acrylate Oligomer Compositions ("AOC") 1-6

To a 500 ml flask was added 2-mercapto ethanol, t-butyl acrylate and/or ethyl methacrylate, and ethyl acetate. Amounts added for Acrylate Oligomer Compositions ("AOC") 1 through 5 differed, and they are shown in Table 2. The mixture was heated to 60° C. with stirring. Nitrogen was bubbled into the mixture for three minutes and a first charge of VAZO 67 was added. The reaction temperature was maintained between 60° C. and 70° C. during the resulting exotherm. After four hours, a second charge of VAZO 67 was added to the mixture and the reaction was allowed to proceed for an additional 16 hours. A sample is removed from the reaction mixture and evaporated to dryness in an oven set at 105° C. in order to determine the % Solids by weight. Acrylate Oligomer Composition 6 was made similarly, but at a larger scale, in a 5-liter flask, and its formulation is also detailed in Table 2.

TABLE 2

Formulations of Acrylate Oligomer Compositions ("AOC") 1-6

| Ingredient | Units | AOC 1 | AOC 2 | AOC 3 | AOC 4 | AOC 5 | AOC 6 |
|---|---|---|---|---|---|---|---|
| ME | g | 6 | 6 | 1.1 | 3 | 4 | 30.3 |
| TBA | g | 176 | 98 | 74 | 74 | — | 895 |
| EMA | g | — | — | — | 18 | 105 | — |
| ETAC | g | 77.9 | 44.8 | 32.3 | 63.5 | 46.8 | 1388 |
| $1^{st}$ VAZO 67 | g | 0.2 | 0.1 | 0.1 | 0.1 | 0.1 | 0.36 |
| $2^{nd}$ VAZO 67 | g | 0.4 | 0.4 | 0.4 | 0.4 | 0.4 | 0.3 |
| % Solids | % | 64% | 72% | 63% | 68% | 71% | 42.3% |

Example 2. Preparation of Acrylate Oligomer Emulsions from Acrylate Oligomer Compositions ("AOC") 1-5

To a 1000 mL flask (for Emulsions 1 and 2) or a 500 mL flask (for Emulsions 3-5) was added an Acrylate Oligomer Composition from the preparations above, ARQUAD 12-50, and methyl isobutyl ketone. Amounts added for Emulsions 1 through 5 differed, and they are shown in Table 3. For each Emulsion, the mixture was heated to 60° C. with stirring. Deionized water was heated in another vessel to 60° C. The heated water was added to the flask and the mixture was stirred for five minutes to provide a two-phase aqueous pre-emulsion. The aqueous pre-emulsion was transferred to a 1000 mL or 500 mL beaker, as appropriate, and the aqueous pre-emulsion was stirred rapidly with a stir bar while being sonicated for four minutes with an ultrasonic homogenizer (obtained under the trade designation "BRANSON SONIFIER 450" from Branson Ultrasonics Corp., Danbury, CT) set at an output level of "10" and a duty cycle setting of "80". The resulting emulsion was then transferred back to the flask, which was then fitted with a Dean-Stark trap and condenser and heated to 100° C. to remove, or "solvent strip", ethyl acetate, methyl isobutyl ketone, and some water to provide the acrylate oligomer emulsion.

TABLE 3

Acrylate Oligomer Emulsion Formulations

| Ingredient | Units | Emulsion 1 | Emulsion 2 | Emulsion 3 | Emulsion 4 | Emulsion 5 |
|---|---|---|---|---|---|---|
| AOC 1 | g | 121.8 | — | — | — | — |
| AOC 2 | g | — | 104.7 | — | — | — |
| AOC 3 | g | — | — | 29.6 | — | — |
| AOC 4 | g | — | — | — | 29.7 | — |
| AOC 5 | g | — | — | — | — | 33 |
| ARQUAD 12-50 | g | 3.1 | 3.0 | 0.8 | 0.8 | 1.0 |
| MIBK | g | 78 | 75.4 | 19.2 | 19.3 | 25 |
| Water | g | 312.2 | 301 | 76.9 | 77.2 | 100 |
| Solvent Strip | g | 82 | 155 | 27 | 27 | 36 |
| % Solids | % | 21.8% | 18.2% | 18.4% | 20.8% | 18.5% |

Example 3. Preparation and Performance of Fluorine-Free Treating Compositions ("FFTC") on Cotton 2 Fabric Fluorine-free treating compositions ("FFTC") 1-5 were prepared by combining an Acrylate Oligomer Emulsion (20 g) prepared as described in Example 2 and water (180 g) with rapid mixing at room temperature.

Cotton 2 fabric was treated with the FFTC 1-5. For Control, Cotton 2 fabric was left untreated. For Comparative Example 1 ("CE1"), Cotton 2 fabric was treated with FC-226 (20 g) diluted with water (180 g). Treatments were performed via the "padding" process as described above. Fabrics were subjected to the Water Repellency Test, the Stain Release Test, and the Spray Rating Test as described above. Testing results, using the 3M Rating Scale (the 1-8 scale) are shown in Table 4.

TABLE 4

Cotton 2 Fabric Testing Results

| Sample | Example 2 Emulsion | WR | Stain Release K | Stain Release E | WR 10 L | Stain Release K 10 L | Stain Release E 10 L | Spray Rating | Spray Rating 10 L |
|---|---|---|---|---|---|---|---|---|---|
| FFTC 1 | 1 | 3 | 6.5 | 7 | −1 | 6 | 6.5 | 50 | 0 |
| FFTC 2 | 2 | 3 | 7.5 | 6.5 | −1 | 6 | 6 | 60 | 0 |
| FFTC 3 | 3 | 3 | 5 | 6 | −1 | 5 | 6 | 60 | 0 |
| FFTC 4 | 4 | 3 | 6 | 6 | −1 | 5 | 6 | 50 | 0 |
| FFTC 5 | 5 | 2 | 6 | 5 | −1 | 5 | 5 | 50 | 0 |
| Control | None | −1 | 4 | 6.5 | — | — | — | — | — |
| CE2 | None | −1 | 5 | 6 | — | 5 | 6 | — | — |

As the data in Table 4 show, the fabric treatments (FTTC 1-5) provide Stain E release and Stain K release of 5 or above, which is better than no treatment (Control) and comparable to the CE1, and all of fabric treatments FTTC 1-5 exhibited better Water Repellency than Control or CE1. Water repellency is desirable, and Spray Ratings values as high as possible are advantageous, and ratings of 50 or better are regarded as adequate. Durability after laundering results indicated that while Water Repellency is not preserved for these FTTC, the stain release properties are well-preserved.

Example 4. Performance of Fluorine-Free Treating Compositions ("FFTC") on P/C 65/35 Fabric P/C 65/35 fabric was treated with the FTTC 1-5 from Example 3. For Control, P/C 65/35 fabric was left untreated. For Comparative Example CE2, P/C 65/35 fabric was treated with FC-226. Treatments were performed via the "padding" process as described above. Fabrics were subjected to the Water Repellency Test, the Stain Release Test, and the Spray Rating Test as described above. Testing results, using the 3M Rating Scale (the 1-8 scale) are shown in Table 5.

TABLE 5

P/C 65/35 Fabric Testing Results

| Sample | WR | Stain Release K | Stain Release E | WR 10 L | Stain Release K 10 L | Stain Release E 10 L | Spray Rating | Spray Rating 10 L |
|---|---|---|---|---|---|---|---|---|
| FFTC 1 | 3 | 6 | 6 | −1 | 6 | 6.5 | 70 | 0 |
| FFTC 2 | 3 | 6 | 5 | −1 | 6 | 6 | 60 | 0 |
| FFTC 3 | 3 | 6 | 5 | −1 | 5 | 6 | 70 | 0 |
| FFTC 4 | 3 | 6 | 5 | −1 | 5 | 6.5 | 70 | 0 |
| FFTC 5 | 3 | 6 | 5 | −1 | 5 | 6 | 60 | 0 |
| Control | −1 | 4 | 4 | — | — | — | — | — |
| CE2 | −1 | 6.5 | 6.5 | −1 | 6 | 6 | — | — |

As the data in Table 5 show, the fabric treatments (FFTC 1-5) provide Stain E release and Stain K release 5 or above, which is better than no treatment (Control) and comparable to the CE2, and all of Samples FFTC 1-5 exhibited better Water Repellency than Control or CE2. Water repellency is desirable, and Spray Ratings values as high as possible are advantageous, and ratings of 50 or better are regarded as adequate. Durability after laundering results indicated that while Water Repellency is not preserved for these Examples, the stain release properties are well-preserved.

Example 5. Emulsion Formulation 6 from Acrylate Oligomer Composition

To a 1000 mL flask was added the Acrylate Oligomer Composition 6 (229 g) from Example 1, ARQUAD 12-50 (9.2 g), propylene glycol (14.7 g), and deionized water (290 g), with rapid mixing at room temperature to provide the aqueous pre-emulsion. The aqueous pre-emulsion was transferred to a 1000 mL beaker and was stirred while being sonicated for four minutes with an ultrasonic homogenizer (obtained under the trade designation "BRANSON SONIFIER 450" from Branson Ultrasonics Corp., Danbury, CT) set at an output level of "10" and a duty cycle setting of "80". The emulsion was then transferred back to the 1000 mL flask, which was then fitted with a Dean-Stark trap and condenser and heated to 100° C. to remove, or "solvent strip" 178 grams of mixed solvents. DANTOGARD PLUS (1.1 g) was added to the emulsion with stirring. The final emulsion had a white fluid color and was 26.0 wt. % solids.

Example 6. Preparation and Use of Fluorine-Free Treating Composition ("FFTC") 6 on Cotton Fabric and Washing at Low Temperatures The following materials were combined in the following order: Deionized water (198 g); Acrylate Oligomer Emulsion 6 (18.75 g); PERMAFRESH ULR (22.5 g); CATALYST 531 (4.5 g); and MYKON HD (6.25 g); with stirring at room temperature to provide Fluorine-Free Treating Composition ("FFTC") 6. Woven fabrics were treated via the "padding" process as described above. Fabrics were dried and cured in an oven at 150° C. for five minutes. Stain release performance was assessed using AATCC Test Method 130-2015 with corn oil ("Stain E") as the predominant stain. Stains were prepared on fabric samples, as described in the test procedure above. Washing procedure condition II in Table 1 of the Test Method procedure (27° C.) using 1993 AATCC Standard Reference Detergent (obtained from AATCC, Research Triangle Park, NC) was carried out with the fabric samples. For this and subsequent Examples, stains were rated on either the AATCC scale (i.e., 1-5 as described above) or the 3M scale (i.e., 1-8 as described above), as indicated. Testing results for Example 25, using the AATCC Rating Scale (the 1-5 scale) are shown in Table 6. Testing results, using the 3M Rating Scale (the 1-8 scale) are shown in Table 7.

Example 7. Preparation and Use of Fluorine-Free Treating Composition ("FFTC") 7 on Polyester/Cotton Fabric and Washing at Low Temperatures The following materials were combined in the following order: Deionized water (198 g); the Acrylate Oligomer Emulsion 6 (9.38 g); FC-226 (9.38 g); PERMAFRESH ULR (22.5 g); CATALYST 531 (4.5 g); MYKON HD (6.25 g) with stirring at room temperature to provide Fluorine-Free Treating Composition ("FFTC") 7. Fabric treatment and stain testing were carried out as described in Example 6. Testing results for FFTC 7, using the AATCC Rating Scale (the 1-5 scale) are shown in Table 6. Testing results, using the 3M Rating Scale (the 1-8 scale) are shown in Table 7.

TABLE 6

STAIN RELEASE TESTING--AATCC TEST METHOD 130. AATCC RATING SCALE

| Fabric | Washes | Treatment | Stain E | Grass | Grape Juice | Gravy | Catalina | Pasta Sauce | Red Enchilada | Mud |
|---|---|---|---|---|---|---|---|---|---|---|
| Cotton 2 | Initial | FFTC 6 | 4 | 5 | 4.5 | 5 | 4 | 5 | 5 | 5 |
| | | Untreated | 4 | 5 | 4.5 | 5 | 4 | 5 | 5 | 5 |
| | 20 L | FFTC 6 | 3 | 5 | 5 | 5 | 3 | 5 | 5 | 5 |
| | | Untreated | 2.5 | 4.5 | 3.5 | 5 | 2.5 | 5 | 5 | 5 |
| Knit Cotton | Initial | FFTC 6 | 4 | 3.5 | 3 | 4.5 | 3.5 | 4.5 | 3.5 | 4 |
| | | Untreated | 3.5 | 3 | 3.5 | 5 | 3 | 5 | 3.5 | 4 |
| | 20 L | FFTC 6 | 4 | 3 | 4 | 5 | 3 | 5 | 3 | 4.5 |
| | | Untreated | 3.5 | 3 | 3.5 | 5 | 3 | 5 | 3 | 4.5 |
| P/C 65/35 | Initial | FFTC 7 | 3.5 | 5 | 3.5 | 5 | 3.5 | 5 | 5 | 5 |
| | | Untreated | 2.5 | 5 | 4.5 | 5 | 2.5 | 5 | 5 | 5 |
| | 20 L | FFTC 7 | 3.5 | 5 | 5 | 5 | 3 | 5 | 4.5 | 4.5 |
| | | Untreated | 3 | 5 | 5 | 5 | 2.5 | 5 | 4 | 4.5 |

As the data in Table 6 show, the Exemplary fabric treatments frequently show equal or better results after one washing, as compared to untreated fabric, for many different stains, and the performance is equal or better after 20 washes for all stains.

TABLE 7

| STAIN RELEASE TESTING--AATCC TEST METHOD 130. 3M RATING SCALE | | | | | | | | | | |
|---|---|---|---|---|---|---|---|---|---|---|
| Fabric | Washes | Treatment | Stain E | Grass | Grape Juice | Gravy | Catalina | Pasta Sauce | Red Enchilada | Mud |
| Cotton 2 | Initial | FFTC 6 | 6.5 | 8 | 7 | 8 | 6.5 | 8 | 8 | 8 |
| | | Untreated | 6.5 | 8 | 6.5 | 8 | 6.5 | 8 | 8 | 8 |
| | 20 L | FFTC 6 | 6 | 7.5 | 7 | 8 | 6 | 8 | 8 | 8 |
| | | Untreated | 4.5 | 8 | 7.5 | 8 | 5 | 8 | 8 | 8 |
| Cotton | Initial | FFTC 6 | 6.5 | 7.5 | 7.5 | 8 | 6.5 | 8 | 7.5 | 8 |
| Spandex | | Untreated | 5 | 8 | 8 | 8 | 5 | 8 | 8 | 6.5 |
| | 20 L | FFTC 6 | 6.5 | 7 | 7.5 | 8 | 6 | 8 | 7 | 7 |
| | | Untreated | 4 | 7 | 7 | 8 | 4.5 | 8 | 7 | 6.5 |
| P/C | Initial | FFTC 7 | 6.5 | 8 | 6.5 | 8 | 6.5 | 8 | 8 | 8 |
| 65/35 | | Untreated | 5 | 7 | 8 | 8 | 5 | 8 | 8 | 8 |
| | 20 L | FFTC 7 | 6 | 8 | 7 | 8 | 5.5 | 8 | 7.5 | 7 |
| | | Untreated | 5.5 | 8 | 7.5 | 8 | 5.5 | 8 | 6.5 | 7.5 |

As the data in Table 7 show, the Exemplary fabric treatments frequently show equal or better results after one washing, as compared to untreated fabric, for many different stains, and the performance is also frequently equal or better after 20 washes. The best results were often obtained for some of the toughest (lowest values) stains.

Example 8. Preparation and Use of Fluorine-Free Treating Composition ("FFTC") 8 on Woven Cotton Fabric and Washing at Low Temperatures The following materials were combined in the following order: Deionized water (279 g) and the Acrylate Oligomer Emulsion 6 (21 g) with stirring at room temperature to provide Fluorine-Free Treating Composition ("FFTC") 8. Fabric treatment and stain testing were carried out as described in Example 6. Testing results, using the AATCC Rating Scale (the 1-5 scale) are shown in Tables 8 and 9.

Example 9. Preparation and Use of Fluorine-Free Treating Composition ("FFTC") 9 on Knit Cotton Fabric and Washing at Low Temperatures The following materials were combined in the following order: Deionized water (190 g) and Acrylate Oligomer Emulsion 6 (10 g) with stirring at room temperature to provide Fluorine-Free Treating Composition ("FFTC") 9. Fabric treatment and stain testing were carried out as described in Example 6. Testing results, using the AATCC Rating Scale (the 1-5 scale) are shown in Tables 8 and 9.

TABLE 8

| STAIN RELEASE TESTING--AATCC TEST METHOD 130. AATCC RATING SCALE | | | | | | | | | | |
|---|---|---|---|---|---|---|---|---|---|---|
| Fabric | Washes | Treatment | Stain K | Stain E | Coppertone | Hawaiian | Tanning Oil | Acne Cream | Ink | Dirty Motor Oil |
| Knit | Initial | FFTC 9 | 3.5 | 3 | 3.5 | 3.5 | 3.5 | 4 | 1.5 | 1.5 |
| Cotton | | Untreated | 2 | 3 | 3 | 3.5 | 2 | 4 | 1.5 | 1.5 |
| | 20 L | FFTC 9 | 2.5 | 3 | 3 | 3 | 3 | 4 | 1.5 | 1.5 |
| | | Untreated | 2 | 3 | 3.5 | 3.5 | 2 | 4 | 1.5 | 1.5 |
| Cotton 1 | Initial | FFTC 8 | 2 | 3 | 3 | 5 | 2 | 4 | 1 | 1 |
| | | Untreated | 2 | 2.5 | 3 | 5 | 2 | 4.5 | 1 | 1 |
| | 20 L | FFTC 8 | 2.5 | 2.5 | 4.5 | 5 | 2 | 4.5 | 2 | 1 |
| | | Untreated | 1 | 2 | 3.5 | 5 | 1 | 5 | 1 | 1 |
| Cotton 2 | Initial | FFTC 8 | 3.5 | 3.5 | 3.5 | 5 | 3.5 | 3.5 | 1 | 1 |
| | | Untreated | 2 | 3 | 4.5 | 4.5 | 2 | 3.5 | 1 | 2 |
| | 20 L | Ex FFTC 8 | 2.5 | 3 | 3.5 | 5 | 2.5 | 5 | 2 | 2 |
| | | Untreated | 1.5 | 1.5 | 3.5 | 4.5 | 1 | 4 | 2 | 1.5 |

TABLE 9

| STAIN RELEASE TESTING--AATCC TEST METHOD 130. AATCC RATING SCALE | | | | | | | | | | |
|---|---|---|---|---|---|---|---|---|---|---|
| Fabric | Washes | Treatment | Catalina | Ranch | Mayo | Mustard | Peanut Butter | Nutella | ExV-OO | Butter Subst. |
| Knit | Initial | FFTC 9 | 3 | 3 | 3.5 | 3 | 3.5 | 3 | 3.5 | 3.5 |
| Cotton | | Untreated | 2 | 3 | 3 | 2 | 2.5 | 2 | 2 | 2 |
| | 20 L | FFTC 9 | 2.5 | 2.5 | 3.5 | 2.5 | 3 | 2.5 | 2.5 | 3 |
| | | Untreated | 1.5 | 3 | 2 | 2.5 | 2 | 2.5 | 2 | 3 |

TABLE 9-continued

STAIN RELEASE TESTING--AATCC TEST METHOD 130. AATCC RATING SCALE

| Fabric | Washes | Treatment | Catalina | Ranch | Mayo | Mustard | Peanut Butter | Nutella | ExV-OO | Butter Subst. |
|---|---|---|---|---|---|---|---|---|---|---|
| Cotton 1 | Initial | FFTC 8 | 3 | 3 | 3 | 4 | 3 | 2.5 | 3 | 3 |
| | | Untreated | 2.5 | 2.5 | 2.5 | 3.5 | 2 | 2 | 2 | 3 |
| | 20 L | FFTC 8 | 3 | 3 | 2.5 | 4 | 2.5 | 2.5 | 2.5 | 2.5 |
| | | Untreated | 2.5 | 2 | 2 | 3.5 | 2 | 2 | 2 | 2 |
| Cotton 2 | Initial | FFTC 8 | 3.5 | 3.5 | 3.5 | 4 | 3 | 2.5 | 3.5 | 3.5 |
| | | Untreated | 3 | 3 | 3 | 3 | 2.5 | 2 | 3 | 3.5 |
| | 20 L | FFTC 8 | 3 | 3 | 3 | 4 | 2 | 2 | 3 | 2.5 |
| | | Untreated | 2.5 | 2 | 2 | 3.5 | 2 | 2 | 2 | 2 |

As the data in Tables 8 and 9 show, the Exemplary fabric treatments frequently show improved performance over no treatment, especially for many of the toughest (lower values) stains.

Example 10. Preparation and Use of Fluorine-Free Treating Composition ("FFTC") 10 on Polyester/Cotton Fabric and Washing at Low Temperatures The following materials were combined in the following order: Deionized water (282 g); the Acrylate Oligomer Emulsion 6 (9 g); and FC-226 (9 g) with stirring at room temperature to provide Fluorine-Free Treating Composition ("FFTC") 10. Fabric treatment and stain testing were carried out as described in Example 6. Testing results, using the AATCC Rating Scale (the 1-5 scale) are shown in Tables 10 and 11.

As the data in Tables 10 and 11 show, the Exemplary fabric treatments frequently show improved performance over no treatment, both for the initial wash and after repeated washings.

Example 11. Preparation of Acrylate Oligomer Compositions ("AOC") 7-9 and 12

To a 500 ml flask was added 2-mercapto ethanol, t-butyl acrylate and/or ethyl methacrylate, and ethyl acetate. Amounts added for Acrylate Oligomer Compositions ("AOC") 7 through 9 and 12 differed, and they are shown in Table 12. The mixture was heated to 60° C. with stirring. Nitrogen was bubbled into the mixture for three minutes and a first charge of VAZO 67 was added. The reaction temperature was maintained between 60° C. and 70° C. during the resulting exotherm. After four hours, a second charge of VAZO 67 was added to the mixture and the reaction was

TABLE 10

STAIN RELEASE TESTING--AATCC TEST METHOD 130. AATCC RATING SCALE

| Fabric | Washes | Treatment | Catalina | Ranch | Mayo | Mustard | Peanut Butter | Nutella | ExV-OO | Butter Subst. |
|---|---|---|---|---|---|---|---|---|---|---|
| P/C | Initial | FFTC 10 | 3.5 | 3.5 | 3 | 4.5 | 3 | 2 | 3.5 | 3.5 |
| 65/35 | | Untreated | 1 | 2 | 2.5 | 4 | 1 | 1 | 2 | 2 |
| | 20 L | FFTC 10 | 3 | 2.5 | 3 | 4.5 | 2.5 | 3 | 3 | 3 |
| | | Untreated | 2.5 | 2 | 2 | 4 | 2 | 2 | 2 | 2 |
| P/C | Initial | FFTC 10 | 3 | 3.5 | 3.5 | 3 | 3 | 3 | 3.5 | 3.5 |
| 40/60 | | Untreated | 2 | 2 | 2 | 3 | 1 | 1 | 2 | 2 |
| | 20 L | FFTC 10 | 3 | 3 | 3.5 | 3 | 3 | 3.5 | 3 | 4.5 |
| | | Untreated | 2 | 2 | 2 | 2 | 2 | 2 | 2 | 2.5 |

TABLE 11

STAIN RELEASE TESTING--AATCC TEST METHOD 130. AATCC RATING SCALE

| Fabric | Washes | Treatment | Stain E | Coppertone | Hawaiian | Dirty Motor Oil | Ink | Tanning Oil | Stain K |
|---|---|---|---|---|---|---|---|---|---|
| P/C | Initial | FFTC 10 | 3 | 3.5 | 4.5 | 1.5 | 1 | 3 | 3 |
| 65/35 | | Untreated | 2.5 | 3 | 3 | 1 | 1 | 2 | 3 |
| | 20 L | FFTC 10 | 3 | 4 | 5 | 2 | 2 | 3 | 2.5 |
| | | Untreated | 2 | 3 | 3 | 1 | 1 | 1.5 | 1.5 |
| P/C | Initial | FFTC 10 | 3.5 | 4.5 | 5 | 2 | 3 | 3 | 3.5 |
| 40/60 | | Untreated | 2 | 2 | 2.5 | 1 | 1 | 2 | 2 |
| | 20 L | FFTC 10 | 3 | 4 | 5 | 2 | 1.5 | 2.5 | 2.5 |
| | | Untreated | 2 | 3 | 3.5 | 1 | 1 | 1.5 | 1.5 |

allowed to proceed for an additional 16 hours. A sample is removed from the reaction mixture and evaporated to dryness in an oven set at 105° C. in order to determine the % Solids by weight.

TABLE 12

| Formulations of Acrylate Oligomer Compositions ("AOC") 7-9 and 12 | | | | | |
|---|---|---|---|---|---|
| Ingredient | Units | AOC 7 | AOC 8 | AOC 9 | AOC 12 |
| ME | g | 4 | 6 | 4 | 6.6 |
| TBA | g | 118 | 98 | | |
| EMA | g | — | — | 105 | |
| STY | g | | | | |
| AN | g | | | | |
| ODA | g | | | | 190 |
| ETAC | g | 52.4 | 44.8 | 46.8 | 84.2 |
| $1^{st}$ VAZO 67 | g | 0.1 | 0.1 | 0.1 | 0.1 |
| $2^{nd}$ VAZO 67 | g | 0.4 | 0.4 | 0.4 | 0.4 |
| % Solids | % | 73.4% | 70.0% | 77.0% | 71.1% |

Example 12. Preparation of Urethane Acrylate Emulsions ("UAE") from Acrylate Oligomer Compositions ("AOC") 7-9 and 12

To a 500 mL flask was added 19.1 grams of AOC 7 acrylate oligomer composition from the preparations above, 21.9 grams of MIBK, 2.5 grams of N3300 and 1 drop of DBTDL were added and the flask was heated to 65c with stirring for 1 hour. 5.4 grams of PEG was then added, and the mixture was stirred for 70 C for 1 hour. 1.7 grams of ARQUAD 12-50 was then added to the flask. To another 400 ml beaker was added 87.4 grams of water was heated to about 60 C. This water was added to the flask with mixing to make a pre-emulsion at about 60 C. The contents were the poured back into the 400 ml beaker to with stirring to be sonicated for four minutes with an ultrasonic homogenizer (obtained under the trade designation BRANSON SONIFIER 450 from Branson Ultrasonics Corp., Danbury, CT) set at an output level of "10" and a duty cycle setting of "80". The resulting emulsion was then transferred back to the flask, which was then fitted with a Dean-Stark trap and condenser and heated to 100° C. to remove, or "solvent strip", ethyl acetate, methyl isobutyl ketone, and some water to provide the urethane acrylate emulsion ("UAE").

TABLES 13 a-c

Urethane Acrylate Emulsion (UAE) Formulations a.

| Ingredient | Units | UAE 1 | UAE 2 | UAE 3 |
|---|---|---|---|---|
| AOC 7 | g | 19.1 | — | — |
| AOC 8 | g | — | 14.3 | |
| AOC 9 | g | — | | 23.4 |
| N3300 | g | 2.5 | 3.1 | 3.6 |
| MR Light | g | | | |
| MIBK | g | 21.9 | 19.6 | 29.3 |
| PEG | g | 5.4 | 6.5 | 7.7 |
| PPG | g | | | |
| ARQUAD 12-50 | g | 1.7 | 0.8 | 2.3 |
| Water | g | 87.4 | 78.5 | 117.2 |
| Solvent Strip | g | 35 | 31 | 46 |
| % Solids | % | 25.2% | 25% | 22.3% |

b.

| Ingredient | Units | UAE 8 | UAE 9 | UAE 10 | UAE 11 | UAE 12 |
|---|---|---|---|---|---|---|
| AOC 12 | g | 22.5 | 18.3 | 21.1 | 21.1 | 21.1 |
| N3300 | g | | | 2.7 | 3.7 | |
| MR Light | g | | | | | 1.9 |
| H12MDI | g | 2.0 | 2.2 | | | |
| MIBK | g | 24.3 | 23.7 | 23.6 | 28.6 | 22.8 |
| PEG | g | 6.3 | 8.5 | 5.9 | 9.9 | 5.9 |
| ARQUAD 12-50 | g | 1.0 | 0.9 | 0.9 | 1.1 | 0.9 |
| Water | g | 121.5 | 118.7 | 94.5 | 114.2 | 91.2 |
| Solvent Strip | g | 32 | 41 | 32 | 43 | 38 |
| % Solids | % | 19.0% | 23.9% | 24.1% | 24.8% | 23.5% |

c.

| Ingredient | Units | UAE 13 | UAE 14 |
|---|---|---|---|
| AOC 6 | g | 21.1 | 4.2 |
| N3300 | g | 2.7 | 18.9 |
| ODA | g | | 21.0* |
| MIBK | g | 21.8 | 58 |
| ETAC | g | | |
| PEG | g | | 15.1 |
| PPG | g | 4.1 | |
| ARQUAD 12-50 | g | 1.1 | 2.3 |
| ETHAQUAD | g | | |
| TMN-6 | g | | |
| Tergitol 15-S-30 | g | | |
| Water | g | 87.2 | 231.9 |

TABLES 13 a-c-continued

| Urethane Acrylate Emulsion (UAE) Formulations | | | |
|---|---|---|---|
| Solvent Strip | g | 37 | 82 |
| % Solids | % | 17.3% | 25.0% |

*ODA was added with the AOC 12.

Fluorine-free urethane treating compositions ("FFUTC") 1-3 and 8-14 were prepared by combining a urethane acrylate emulsion UAE (20 g) prepared as described in Example 12 and water (180 g) in a beaker and stirred with a tongue depressor at room temperature using ingredients listed in Tables 13. a-c.

Cotton 2 fabric was treated with the FFUTC 1-3 and 8-14. For Control, Cotton 2 fabric was left untreated. For Comparative Example 1 ("CE1"), Cotton 2 fabric was treated with FC-226. Treatments were performed via the "padding" process as described above. Fabrics were subjected to the Water Repellency Test, the Stain Release Test, and the Spray Rating Test as described above. Testing results, using the 3M Rating Scale (the 1-8 scale) are shown in Table 14.

| Sample | UAE | WR | Stain Release K | Stain Release E | WR 10 L | Stain Release K 10 L | Stain Release 10 L | Spray Rating | Spray Rating 10 L |
|---|---|---|---|---|---|---|---|---|---|
| FFUTC 1 | 1 | 3 | 6 | 6.5 | −1 | 6 | 7 | 60 | 0 |
| FFUTC 10 | 10 | 4 | 4 | 6.5 | 3 | 4 | 6 | 80 | 60 |
| FFUTC 2 | 2 | 3 | 5 | 6.5 | −1 | 4 | 6 | 60 | 0 |
| FFUTC 9 | 9 | 4 | 5.5 | 6.5 | −1 | 4 | 5 | 60 | 0 |
| FFUTC 13 | 13 | 3 | 6 | 6 | 1 | 4 | 5 | 75 | 0 |
| FFUTC 8 | 8 | 4 | 5 | 6 | −1 | 5 | 6.5 | — | — |
| FFUTC 14 | 14 | 4 | 4 | 6 | −1 | 4 | 5 | 50 | 0 |
| FFUTC 3 | 3 | 2 | 5 | 6 | −1 | 5 | 5 | 50 | 0 |
| FFUTC 12 | 12 | 4 | 5 | 3 | −1 | 3 | 4 | 75 | 0 |
| CE1 | None | −1 | 5 | 6 | — | 5 | 6 | — | — |
| Control | none | −1 | 4 | 6.5 | — | — | — | — | — |

Poly Cotton 65/35 fabric was treated with the FFUTC 1-3 and 8-14. For Control, Poly Cotton 65/35 fabric was left untreated. For Comparative Example 1 ("CE1"), Poly Cotton 65/35 fabric was treated with FC-226. Treatments were performed via the "padding" process as described above. Fabrics were subjected to the Water Repellency Test, the Stain Release Test, and the Spray Rating Test as described above. Testing results, using the 3M Rating Scale (the 1-8 scale) are shown in Table 15.

| | WR | Stain Release K | Stain Release E | WR 10 L | Stain Release K 10 L | Stain Release E 10 L | Spray Rating | Spray Rating 10 L |
|---|---|---|---|---|---|---|---|---|
| FFUTC 14 | 4 | 5 | 7 | −1 | 4 | 6.5 | 70 | 0 |
| FFUTC 1 | 3 | 6 | 6.5 | −1 | 6 | 6 | 70 | 0 |
| FFUTC 9 | 4 | 4 | 6.5 | −1 | 5 | 6 | 60 | 0 |
| FFUTC 10 | 4 | 6 | 6 | 3 | 6 | 6.5 | 75 | 60 |
| FFUTC 11 | 4 | 6.5 | 6 | 3 | 6.5 | 6 | 75 | 0 |
| FFUTC 3 | 2 | 5 | 6 | −1 | 6 | 6 | 50 | 0 |
| FFUTC 2 | 4 | 5 | 6 | −1 | 4 | 6 | 70 | 0 |
| FFUTC 12 | 4 | 4 | 4 | −1 | 3 | 4 | 75 | 0 |
| FFUTC 8 | 4 | 4 | 4 | −1 | 4 | 4 | — | — |
| FFUTC 13 | 3 | 2 | 2 | 2 | 2 | 2 | 75 | 0 |
| Control | −1 | 4 | 4 | — | — | — | — | — |
| CE2 | −1 | 6.5 | 6.5 | −1 | 6 | 6 | — | — |

Example 13. Dual Action Formulas

Dual action (stain release and water repellency for 20 launderings) fluorine-free treating compositions ("DAFFTC") 1-14 were prepared by combining Emulsion A, Emulsion B (optional), XAN and water in a beaker while mixing with a tongue depressor at room temperature. Compositions are identified in Table 16.

TABLE 16

| Dual Action Fluorine-free Treating Compositions | | | | |
|---|---|---|---|---|
| | Emulsion A | Emulsion B | XAN (g) | Water (g) |
| DAFFTC 1 | UAE 10, 10 g | | 0.5 | 89.5 |
| DAFFTC 2 | UAE 10, 10 g | | 1 | 89 |
| DAFFTC 3 | UAE 10, 10 g | | 1.5 | 88.5 |
| DAFFTC 4 | UAE 10, 10 g | | 2 | 88 |
| DAFFTC 5 | UAE 10, 10 g | | 2.5 | 87.5 |

TABLE 16-continued

| Dual Action Fluorine-free Treating Compositions | | | | |
|---|---|---|---|---|
| | Emulsion A | Emulsion B | XAN (g) | Water (g) |
| DAFFTC 6 | UAE 10, 10 g | PM-3888, 1 g | 1 | 88 |
| DAFFTC 7 | UAE 10, 10 g | PM-3888, 1.5 g | 1.5 | 78 |
| DAFFTC 8 | UAE 10, 10 g | PM-3888, 2 g | 2 | 86 |
| DAFFTC 9 | UAE 10, 10 g | PM-3705, 1 g | 1 | 88 |
| DAFFTC 10 | UAE 10, 10 g | PM-3705, 1.5 g | 1.5 | 87 |
| DAFFTC 11 | UAE 10, 10 g | PM-3705, 2 g | 2 | 86 |
| DAFFTC 12 | UAE 1, 20 g | | 2 | 178 |
| DAFFTC 13 | UAE 1, 20 g | | 3 | 177 |
| DAFFTC 14 | UAE 1, 20 g | | 4 | 176 |

Dual action has good stain release while have a good spray rating initially and after 20 launderings.

Fabric: Thermal Pique (Royal Blue) PET

Thermal Pique (Royal Blue) PET fabric was treated with the DAFTC 1-11. For Control, Poly Thermal Pique (Royal Blue) PET was left untreated. Treatments were performed via the "padding" process as described above. Fabrics were subjected to the Water Repellency Test, the Stain Release Test, and the Spray Rating Test as described above. Testing results, using the AATCC Rating Scale (the 1-5 scale) are shown in Tables 17 and 18.

TABLE 17

| Thermal Pique (Royal Blue) PET Fabric Testing Results | | | | | | |
|---|---|---|---|---|---|---|
| | WR | Spray Rating | Stain Release E | WR 20 L | Spray Rating 20 L | Stain Release E 20 L |
| DAFFTC 1 | 3 | 80 | 5 | 1 | 60 | 4 |
| DAFFTC 2 | 3 | 80 | 5 | 3 | 75 | 5 |
| DAFFTC 3 | 3 | 80 | 5 | 3 | 80 | 5 |
| DAFFTC 4 | 3 | 80 | 5 | 3 | 80 | 4 |
| DAFFTC 5 | 4 | 85 | 4.5 | 3 | 85 | 3.5 |
| DAFFTC 6 | 3 | 80 | 4.5 | 3 | 75 | 4.5 |
| DAFFTC 7 | 4 | 85 | 5 | 3 | 80 | 4.5 |
| DAFFTC 8 | 4 | 85 | 4.5 | 3 | 80 | 4 |
| DAFFTC 9 | 4 | 85 | 4.5 | 3 | 75 | 4 |
| DAFFTC 10 | 4 | 85 | 5 | 3 | 80 | 4.5 |
| DAFFTC 11 | 4 | 85 | 4 | 3 | 75 | 3.5 |
| FFUTC 1 | 3 | 70 | 5 | 1 | 60 | 5 |
| FFUTC 10 | 4 | 80 | 5 | 0 | 0 | 5 |
| Untreated | 3 | 75 | 2 | 0 | 0 | 1 |

Untreated has no water repellency or spray and certain fabrics have poor stain release as well. All the formulas improved spray and water repellency while maintaining stain release.

TABLE 18

| STAIN RELEASE TESTING--AATCC TEST METHOD 130. AATCC RATING SCALE | | | | | | | |
|---|---|---|---|---|---|---|---|
| Formula | Material | WR | Spray Rating | Stain Release E | WR 20 L | Spray Rating 20 L | Stain Release E 20 L |
| DAFFTC 12 | 40/60 P/C | 3 | 80 | 3.5 | 2 | 50 | 3 |
| | 65/35 P/C | 3 | 75 | 3 | 3 | 75 | 3 |
| | Cotton 2 | 3 | 75 | 3.5 | 0 | 50 | 3 |
| | Cotton 5 | 3 | 80 | 3 | 1 | 60 | 2.5 |
| DAFFTC 13 | 40/60 P/C | 3 | 80 | 3 | 2 | 60 | 2.5 |
| | 65/35 P/C | 3 | 80 | 3 | 3 | 70 | 3 |
| | Cotton 2 | 3 | 75 | 3.5 | 1 | 50 | 2.5 |
| | Cotton 5 | 3 | 80 | 3 | 2 | 70 | 2 |
| DAFFTC 14 | 40/60 P/C | 3 | 80 | 3 | 2 | 70 | 2 |
| | 65/35 P/C | 3 | 80 | 3 | 3 | 75 | 2.5 |
| | Cotton 2 | 3 | 80 | 3.5 | 1 | 60 | 2.5 |
| | Cotton 5 | 3 | 80 | 2.5 | 2 | 60 | 2 |
| DAFFTC 7 | Nylon, Tan | 4 | 80 | 3.5 | 2 | 60 | 3.5 |
| | Nylon, White | 3 | 85 | 3.5 | 1 | 50 | 4 |
| | PET, Blue | 3 | 80 | 5 | 3 | 80 | 4 |
| | PET, White | 3 | 85 | 5 | 2 | 70 | 4 |
| DAFFTC 10 | Nylon, Tan | 3 | 85 | 3.5 | 2 | 50 | 4 |
| | Nylon, White | 3 | 85 | 3 | 0 | 50 | 4 |
| | PET, Blue | 3 | 80 | 5 | 3 | 80 | 5 |
| | PET, White | 3 | 80 | 5 | 2 | 60 | 3.5 |
| Untreated | 40/60 P/C | 0 | 0 | 2 | 0 | 0 | 3 |
| | 65/35 P/C | 0 | 0 | 2 | 0 | 0 | 3 |
| | Cotton 2 | 0 | 0 | 3 | 0 | 0 | 3 |
| | Cotton 5 | 0 | 0 | 2 | 0 | 0 | 2 |
| | Nylon, Tan | 0 | 0 | 3.5 | 0 | 0 | 3.5 |
| | Nylon, White | 0 | 0 | 4 | 0 | 0 | 5 |
| | PET, Blue | 0 | 0 | 5 | 0 | 0 | 5 |
| | PET, White | 1 | 0 | 5 | 0 | 0 | 5 |

Untreated has no water repellency or spray and certain fabrics have poor stain release as well. All the formulas improved spray and water repellency while maintaining stain release.

Example 14. Waterborne Acrylate Oligomers ("WAOs")

Making a polymer in water is possible using a more hydrophobic mercaptan group. In these examples, n-octylmercaptan was used, other more hydrophobic mercaptan groups could also work.

Waterborne Acrylate Oligomer 1

To a 250 mL flask was added 113.0 grams DI water, 15.0 grams propylene glycol, 1.3 grams ETHAQUAD C12, 3.0 grams Tergitol TMN-6, 1.5 grams Tergitol 15-S-30, 47.0 grams t-butyl acrylate, 3.0 grams n-Octylmercaptan. This mixture was heated to 50° C. with mixing and then transferred another 400 ml beaker. The contents were to be sonicated for four minutes with an ultrasonic homogenizer (obtained under the trade designation BRANSON SONIFIER 450 from Branson Ultrasonics Corp., Danbury, CT) set at an output level of "10" and a duty cycle setting of "80" while stirring. Then the contents were poured back into the 250 ml flask. Then 0.2 grams of Vazo 50 was added. The contents were purged with nitrogen and heated to 65° C. The contents exothermed to 90 C. After 1 hour, another 0.2 grams of Vazo 50 was added. The reaction was continued for another 2 hours at 80° C. The resulting product was a milky white emulsion with no sediment. The % solids was 30.3%. Waterborne Acrylate Oligomer 2 is the same as 1 but without the propylene glycol.

Fluorine-free waterborne acrylate oligomer ("WAO") treating compositions were prepared by combining a waterborne acrylate oligomer prepared as described in waterborne acrylate oligomer Example 1 and 2 and water in a beaker and stirred with a tongue depressor at room temperature. The g/L is grams per liter concentration of the composition and calculated below:

| | WAO | Water |
|---|---|---|
| 30 g/L | 4.5 g | 145.5 |
| 40 g/L | 6 g | 144 |
| 50 g/L | 7.5 g | 142.5 |
| 60 g/L | 9 g | 141 |
| 70 g/L | 10.5 g | 139.5 |
| 80 g/L | 12 g | 138 |
| 90 g/L | 13.5 g | 136.5 |
| 100 g/L | 15 g | 135 |

TABLE 19

STAIN RELEASE TESTING--AATCC TEST METHOD 130. AATCC RATING SCALE

| Series | WAO g/L | Material | Washes | Stain E | Stain K |
|---|---|---|---|---|---|
| WAO 1 | 30 | Cotton 2 | 20 L | 3.5 | 3.5 |
| WAO 1 | 30 | Polycotton 65/35 | 20 L | 3 | 3 |
| WAO 1 | 40 | Cotton 2 | 20 L | 3 | 3 |
| WAO 1 | 40 | Polycotton 65/35 | 20 L | 3.5 | 3 |
| WAO 1 | 50 | Cotton 2 | 20 L | 3 | 3 |
| WAO 1 | 50 | Polycotton 65/35 | 20 L | 3 | 3 |
| WAO 1 | 60 | Cotton 2 | 20 L | 3.5 | 3 |
| WAO 1 | 60 | Polycotton 65/35 | 20 L | 3 | 3 |
| WAO 1 | 70 | Cotton 2 | 20 L | 3.5 | 3 |
| WAO 1 | 70 | Polycotton 65/35 | 20 L | 3 | 3 |
| WAO 1 | 80 | Cotton 2 | 20 L | 3 | 3 |
| WAO 1 | 80 | Polycotton 65/35 | 20 L | 3.5 | 3 |
| WAO 1 | 90 | Cotton 2 | 20 L | 3 | 3 |
| WAO 1 | 90 | Polycotton 65/35 | 20 L | 3 | 3 |
| WAO 1 | 100 | Cotton 2 | 20 L | 3 | 3 |
| WAO 1 | 100 | Polycotton 65/35 | 20 L | 3 | 3 |
| WAO 1 | 30 | Cotton 2 | 5 L | 3.5 | 3 |
| WAO 1 | 30 | Polycotton 65/35 | 5 L | 3 | 3 |
| WAO 1 | 40 | Cotton 2 | 5 L | 3 | 3.5 |
| WAO 1 | 40 | Polycotton 65/35 | 5 L | 3.5 | 3 |
| WAO 1 | 50 | Cotton 2 | 5 L | 3 | 3 |
| WAO 1 | 50 | Polycotton 65/35 | 5 L | 3.5 | 3 |
| WAO 1 | 60 | Cotton 2 | 5 L | 3 | 3 |
| WAO 1 | 60 | Polycotton 65/35 | 5 L | 3 | 3 |
| WAO 1 | 70 | Cotton 2 | 5 L | 3.5 | 3.5 |
| WAO 1 | 70 | Polycotton 65/35 | 5 L | 3.5 | 3 |
| WAO 1 | 80 | Cotton 2 | 5 L | 4 | 3 |
| WAO 1 | 80 | Polycotton 65/35 | 5 L | 3.5 | 3.5 |
| WAO 1 | 90 | Cotton 2 | 5 L | 4 | 3.5 |
| WAO 1 | 90 | Polycotton 65/35 | 5 L | 3.5 | 3 |
| WAO 1 | 100 | Cotton 2 | 5 L | 3.5 | 3 |
| WAO 1 | 100 | Polycotton 65/35 | 5 L | 3.5 | 3 |
| WAO 1 | 30 | Cotton 2 | Initial | 4.5 | 3.5 |
| WAO 1 | 30 | Polycotton 65/35 | Initial | 4 | 3 |
| WAO 1 | 40 | Cotton 2 | Initial | 4.5 | 3.5 |
| WAO 1 | 40 | Polycotton 65/35 | Initial | 3.5 | 3.5 |
| WAO 1 | 50 | Cotton 2 | Initial | 4.5 | 3 |
| WAO 1 | 50 | Polycotton 65/35 | Initial | 3 | 3.5 |
| WAO 1 | 60 | Cotton 2 | Initial | 4 | 3 |
| WAO 1 | 60 | Polycotton 65/35 | Initial | 3 | 3 |
| WAO 1 | 70 | Cotton 2 | Initial | 4.5 | 3 |
| WAO 1 | 70 | Polycotton 65/35 | Initial | 3.5 | 3 |
| WAO 1 | 80 | Cotton 2 | Initial | 4.5 | 3 |
| WAO 1 | 80 | Polycotton 65/35 | Initial | 3.5 | 3.5 |
| WAO 1 | 90 | Cotton 2 | Initial | 4 | 3 |
| WAO 1 | 90 | Polycotton 65/35 | Initial | 3.5 | 3.5 |
| WAO 1 | 100 | Cotton 2 | Initial | 4.5 | 3.5 |
| WAO 1 | 100 | Polycotton 65/35 | Initial | 3 | 3 |
| WAO 2 | 30 | Cotton 2 | 20 L | 3.5 | 3 |
| WAO 2 | 30 | Polycotton 65/35 | 20 L | 3.5 | 3 |
| WAO 2 | 40 | Cotton 2 | 20 L | 3 | 3 |
| WAO 2 | 40 | Polycotton 65/35 | 20 L | 3.5 | 3 |
| WAO 2 | 50 | Cotton 2 | 20 L | 3 | 3 |
| WAO 2 | 50 | Polycotton 65/35 | 20 L | 3 | 3 |
| WAO 2 | 60 | Cotton 2 | 20 L | 3 | 3 |
| WAO 2 | 60 | Polycotton 65/35 | 20 L | 3.5 | 3 |
| WAO 2 | 70 | Cotton 2 | 20 L | 3 | 3 |
| WAO 2 | 70 | Polycotton 65/35 | 20 L | 3 | 3 |
| WAO 2 | 80 | Cotton 2 | 20 L | 3 | 3.5 |
| WAO 2 | 80 | Polycotton 65/35 | 20 L | 3 | 3 |
| WAO 2 | 90 | Cotton 2 | 20 L | 3.5 | 3 |
| WAO 2 | 90 | Polycotton 65/35 | 20 L | 3 | 3 |
| WAO 2 | 100 | Cotton 2 | 20 L | 3.5 | 3 |
| WAO 2 | 100 | Polycotton 65/35 | 20 L | 3 | 3 |
| WAO 2 | 30 | Cotton 2 | 5 L | 3.5 | 3 |
| WAO 2 | 30 | Polycotton 65/35 | 5 L | 3 | 3 |
| WAO 2 | 40 | Cotton 2 | 5 L | 3.5 | 3 |
| WAO 2 | 40 | Polycotton 65/35 | 5 L | 3.5 | 3 |
| WAO 2 | 50 | Cotton 2 | 5 L | 3.5 | 3 |
| WAO 2 | 50 | Polycotton 65/35 | 5 L | 3.5 | 3 |
| WAO 2 | 60 | Cotton 2 | 5 L | 3.5 | 3.5 |

What is claimed is:

1. An acrylate oligomer emulsion comprising:

an oligomer represented by the formula:

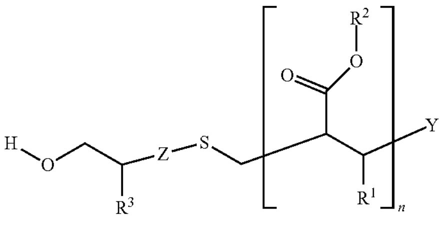

wherein $R^1$ is hydrogen or methyl, $R^2$ is an alkyl group having from 2 to 18 carbons, inclusive, $R^3$ is hydrogen or hydroxyl, Y is hydrogen or an initiator residue, Z is a single bond or methylene, and n is an integer from 9 to 40, inclusive;

water; and a surfactant.

2. The oligomer of claim 1, wherein $R^2$ is an alkyl group having 2 to 4 carbons.

3. The oligomer of claim 1, wherein $R^2$ is t-butyl group.

4. The oligomer of claim 1, wherein n is 16 to 20.

5. The oligomer of claim 1, wherein the oligomer is made by the radical-initiated reaction of a reaction mixture comprising 2-mercaptoethanol and a (meth)acrylate.

6. The oligomer of claim 5, wherein the (meth)acrylate is selected from the group consisting of octadecyl acrylate, ethyl methacrylate, t-butyl acrylate, t-butyl methacrylate, and combinations thereof.

7. The acrylate oligomer emulsion of claim 1 wherein the acrylate oligomer emulsion comprises 0.3 wt. % to 1.3 wt. % surfactant on a solids basis.

8. The acrylate oligomer emulsion of claim 1, further comprising a glycol and/or a preservative.

9. A fluorine-free treating composition comprising:

0.1 wt. % to 4 wt. % solids on fabric of the acrylate oligomer emulsion of claim 1;

water; and optionally an additive selected from the group consisting of a fabric softener, an antiwrinkle finish, a protective material, and combinations thereof.

10. A method of treating a fibrous substrate, the method comprising:

preparing a fluorine-free treating composition of claim 9;

applying the fluorine-free treating composition to a fibrous substrate in an amount sufficient to make the fibrous substrate exhibit stain release that is better than the stain release of a similar fibrous substrate without the composition applied.

11. A fluorine-free treating composition comprising:

0.1 wt. % to 4 wt. % solids on fabric of a urethane oligomer emulsion comprising:

a urethane oligomer represented by the formula:

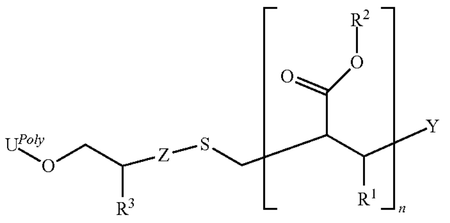

wherein $U^{Poly}$ comprises a urethane polymer backbone, $R^1$ is hydrogen or methyl, $R^2$ is an alkyl group having from 2 to 18 carbons, inclusive, $R^3$ is hydrogen or hydroxyl, Y is hydrogen or an initiator residue, Z is a single bond or methylene, and n is an integer from 9 to 40, inclusive, water; and a surfactant;

and optionally an additive selected from the group consisting of a fabric softener, an antiwrinkle finish, a protective material, and combinations thereof.

12. The fluorine-free treating composition of claim 11, further comprising a blocked isocyanate extender.

13. A method of treating a fibrous substrate, the method comprising:

preparing a fluorine-free treating composition of claim 11;

applying the fluorine-free treating composition to a fibrous substrate in an amount sufficient to make the fibrous substrate exhibit stain release that is better than the stain release of a similar fibrous substrate without the composition applied.

14. A fluorine-free treating composition comprising:

0.1 wt. % to 4 wt. % solids on fabric of an acrylate oligomer emulsion comprising:

an oligomer represented by the formula:

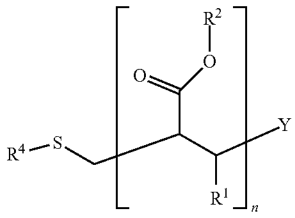

wherein $R^1$ is hydrogen or methyl, $R^2$ is an alkyl group having from 2 to 18 carbons, inclusive, $R^4$ is a hydrocarbon group, Y is hydrogen or an initiator residue, and n is an integer from 9 to 40, inclusive;

water; and a surfactant;

and optionally an additive selected from the group consisting of a fabric softener, an antiwrinkle finish, a protective material, and combinations thereof.

15. A method of treating a fibrous substrate, the method comprising:

preparing a fluorine-free treating composition of claim 14;

applying the fluorine-free treating composition to a fibrous substrate in an amount sufficient to make the fibrous substrate exhibit stain release that is better than the stain release of a similar fibrous substrate without the composition applied.

* * * * *